(12) United States Patent
Hamid et al.

(10) Patent No.: US 9,866,388 B2
(45) Date of Patent: Jan. 9, 2018

(54) PORTABLE DEVICE INTERFACE METHODS AND SYSTEMS

(71) Applicant: BluInk Ltd., Ottawa (CA)

(72) Inventors: Laurence Hamid, Ottawa (CA); Stephen Borza, Ottawa (CA)

(73) Assignee: BluInk Ltd., Ottawa (CA)

( * ) Notice: Subject to any disclaimer, the term of this patent is extended or adjusted under 35 U.S.C. 154(b) by 35 days.

(21) Appl. No.: 14/946,986

(22) Filed: Nov. 20, 2015

(65) Prior Publication Data

US 2016/0148597 A1 May 26, 2016

Related U.S. Application Data

(60) Provisional application No. 62/082,269, filed on Nov. 20, 2014.

(51) Int. Cl.

| | |
|---|---|
| *G06F 3/00* | (2006.01) |
| *H04L 9/32* | (2006.01) |
| *G06F 3/16* | (2006.01) |
| *G06F 12/14* | (2006.01) |
| *G06F 21/00* | (2013.01) |
| *G06F 3/0482* | (2013.01) |
| *G06F 21/31* | (2013.01) |
| *G06F 21/44* | (2013.01) |
| *H04W 12/04* | (2009.01) |

(Continued)

(52) U.S. Cl.
CPC .......... *H04L 9/3234* (2013.01); *G06F 3/0482* (2013.01); *G06F 3/167* (2013.01); *G06F 12/1408* (2013.01); *G06F 21/00* (2013.01); *G06F 21/31* (2013.01); *G06F 21/44* (2013.01); *G06F 3/1454* (2013.01); *G06F 2212/1052* (2013.01); *G06F 2221/2115* (2013.01); *G09G 2354/00* (2013.01); *G09G 2370/16* (2013.01); *H04W 12/02* (2013.01); *H04W 12/04* (2013.01)

(58) Field of Classification Search
CPC ....... H04L 9/3234; G06F 21/31; G06F 21/44; G06F 3/0482; G06F 21/00; G06F 3/167; G06F 12/1408; G06F 2221/2115; G06F 3/1454; G06F 2212/1052; H04W 12/04; G09G 2370/16; G09G 2354/00
See application file for complete search history.

(56) References Cited

U.S. PATENT DOCUMENTS

| | | | | |
|---|---|---|---|---|
| 2011/0264645 A1* | 10/2011 | Mital | .................... | G06F 3/0482 707/708 |
| 2013/0300546 A1* | 11/2013 | Kim | ...................... | G08C 19/00 340/12.22 |

\* cited by examiner

*Primary Examiner* — Adam R Giesy
(74) *Attorney, Agent, or Firm* — Rosenberg, Klein & Lee

(57) ABSTRACT

While portable electronic devices such as smartphones have become ubiquitous for billions of users their primarily uses are consuming content or generating limited low complexity data. In contrast, laptops, desktop PCs etc. allow users to enter extended and/or complex content due to ergonomic user interfaces such as keyboard and mouse. Moving data requires either a third electronic device, e.g. a USB memory drive, or remotely storing the content. Accordingly, it would be beneficial to provide users with the benefit of entering and generating content on one or more electronic systems supporting ergonomic and user compatible haptic interfaces with the ability to store this upon their PED, e.g. smartphone. It would be further beneficial to provide the user also with a means to enter information into applications upon their PED through such external interfaces rather than the haptic interface of their PED, e.g. typically a small touchscreen.

2 Claims, 11 Drawing Sheets

(51) Int. Cl.
*G06F 3/14* (2006.01)
*H04W 12/02* (2009.01)

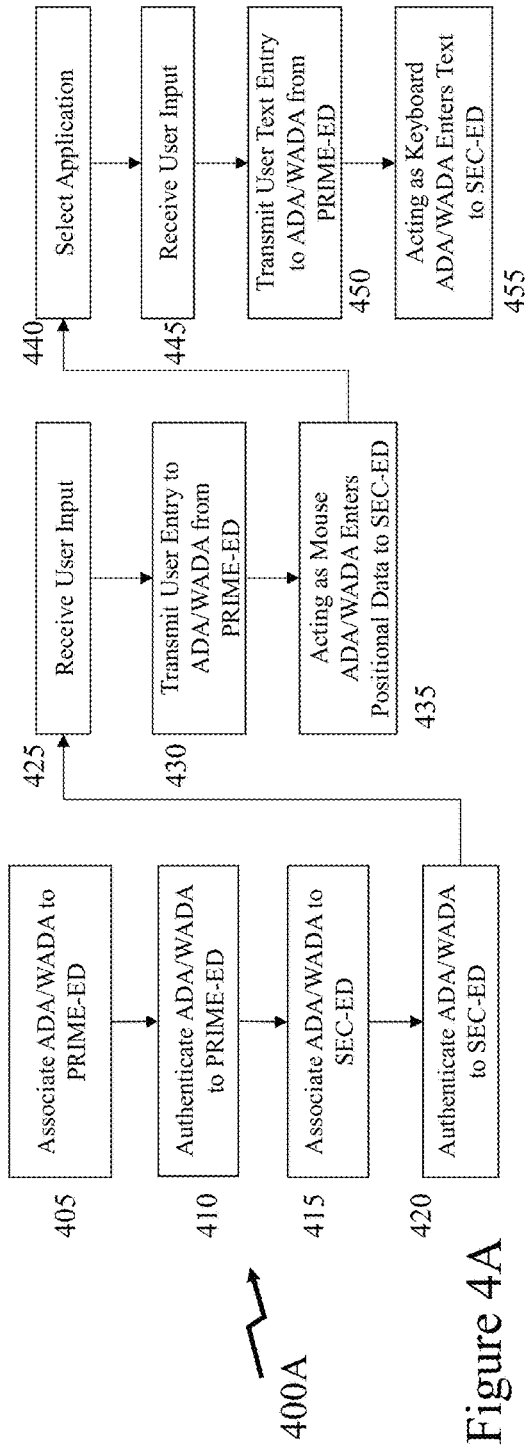
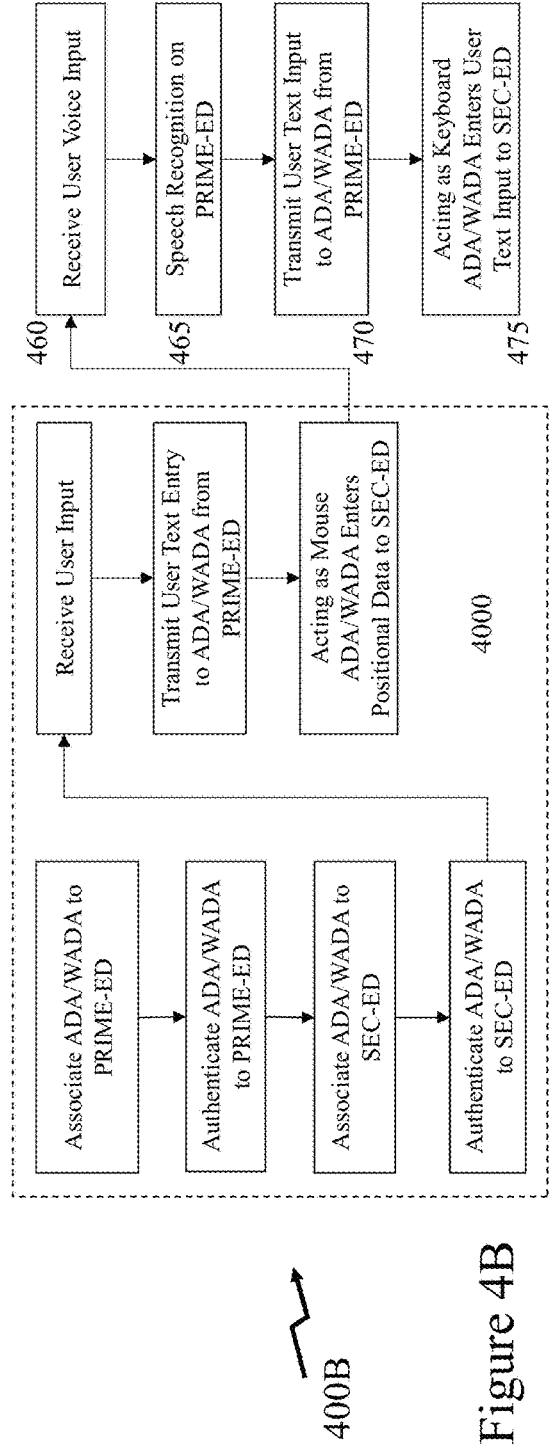
Figure 4A
Figure 4B

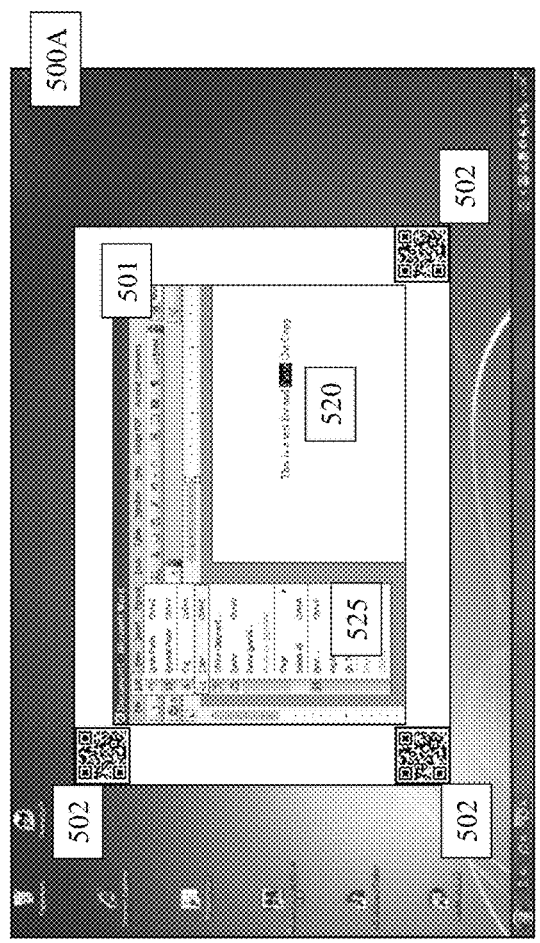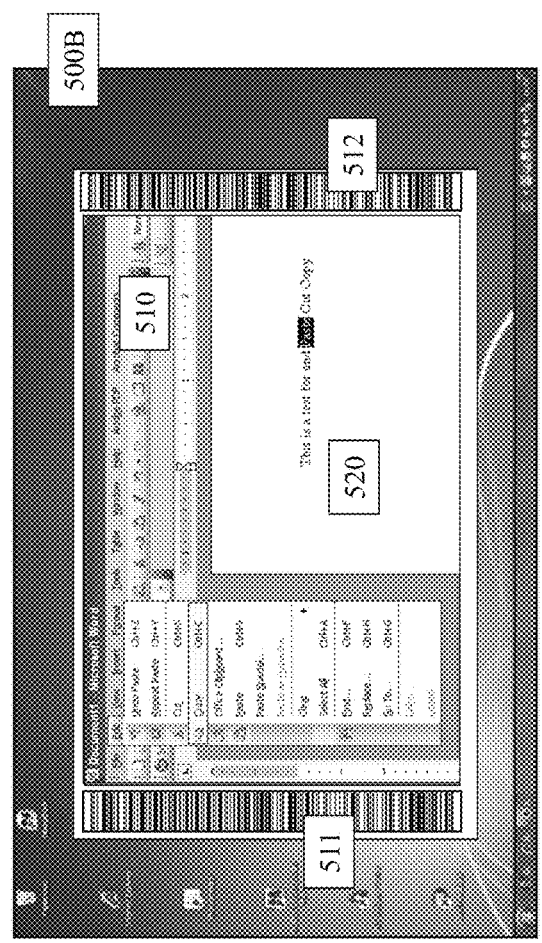
Figure 5A
Figure 5B

PORTABLE DEVICE INTERFACE METHODS AND SYSTEMS

CROSS-REFERENCE TO RELATED APPLICATIONS

This application claims the benefit of priority from U.S. Provisional Patent Application Ser. No. 62/082,269 entitled "Portable Device Interface Methods and Systems" filed Nov. 20, 2014, the entire contents of which are incorporated herein by reference.

FIELD OF THE INVENTION

This invention relates to portable electronic devices and more particularly to employing portable electronic devices as primary interfaces to other electronic devices.

BACKGROUND OF THE INVENTION

A users enters data into a wide variety of software applications ranging including word processors, spreadsheets, electronic mail, and social media. Whilst in some instances such as passwords or user identities used for user authentication to prove identity or access approval to gain access to a resource then this data entry is relatively short but in general data entry is not short. Accordingly, whilst today portable electronic devices such as smartphones have become a ubiquitous element for billions of users their use today is primarily as a means of consuming content or information and not generating it. In contrast, laptops, desktop PCs etc. remain the device of choice for entering extended content due to the eased user interfaces of a keyboard and mouse rather than a small touchscreen. As such the user today must either use a third electronic device, e.g. a memory stick or USB memory drive, to store the generated content for use/access on another electronic system or have the content remotely hosted on the Internet, commonly referred to as "in the Cloud." Accordingly, it would be beneficial to provide users with the benefit of entering and generating content on one or more electronic systems supporting ergonomic and user compatible haptic interfaces with the ability to store this upon their PED, e.g. smartphone. It would be further beneficial to provide the user also with a means to enter information into applications upon their PED through such external interfaces rather than the haptic interface of their PED, e.g. typically a small touchscreen.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to portable electronic devices and more particularly to employing portable electronic devices as primary interfaces to other electronic devices.

In accordance with an embodiment of the invention there is provided a method of entering at least one of user data and user commands to an electronic system by associating with the electronic system and an electronic device associated with a user a user interface adapter (UIA), wherein the UIA enters the at least one of user data and user commands to the electronic system.

In accordance with an embodiment of the invention there is provided a method of providing a voice interface to an electronic system by providing a voice recognition process upon a portable electronic device (PED) associated with the user and a user interface adapter (UIA) coupled to the electronic system and PED wherein the UIA receives voice recognition data from the PED and provides this to the electronic system by emulating a haptic interface of the electronic system.

In accordance with an embodiment of the invention there is provided a method of entering data to a portable electronic device (PED) by providing a user interface adapter (UIA) coupled to the PED and an electronic system with a haptic interface, wherein the UIA provides a first synchronization software application for installation upon the electronic system allowing for user entered data via the haptic interface of the electronic system to be communicated to the PED via the UIA.

In accordance with an embodiment of the invention there is provided a method of securely storing data upon an external non-volatile non-transitory storage medium comprising executing encryption data upon a portable electronic device (PED) and transmitting it to the external non-volatile non-transitory storage medium via a user interface adaptor (UIA) coupled to the external non-volatile non-transitory storage medium and PED.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 4A to 4C depict simplified flow diagrams of methods according to embodiment of the invention relating to employing a user' PED as an interface to another electronic device;

FIGS. 5A to 5C depict simplified diagrams of display screens within windows having encoded data for encoding information about the window in the form of 2D and 1D bar codes respectively according to embodiments of the invention;

DETAILED DESCRIPTION

Figure 1:
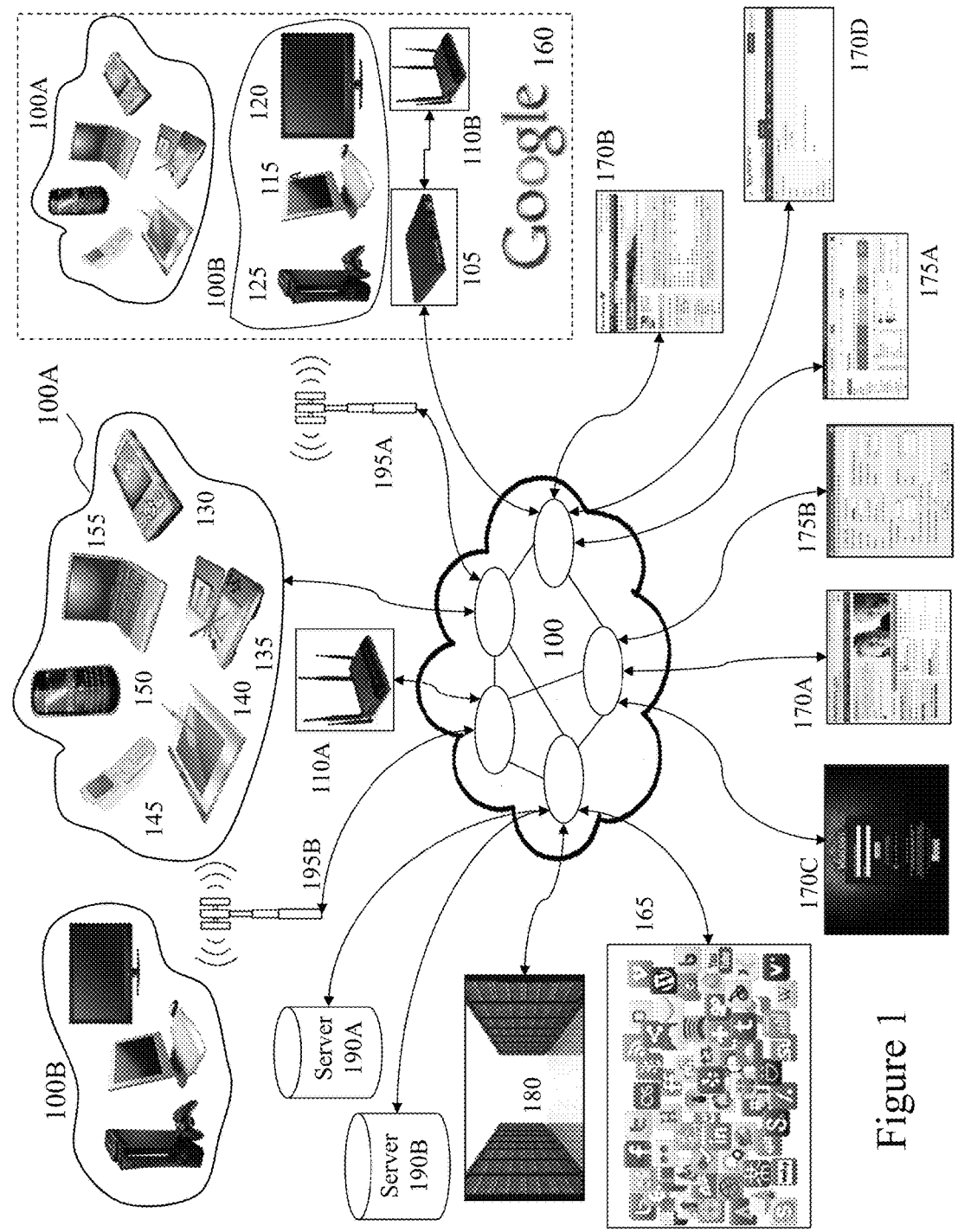
FIG. 1 depicts a network environment within which embodiments of the invention may be employed.

The present invention is directed to portable electronic devices and more particularly to employing portable electronic devices as primary interfaces to other electronic devices.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals who by their engagement with a service provider, third party provider, enterprise, social network, social media etc. via a dashboard, web service, website, software plug-in, software application, graphical user interface accesses, for example, electronic content and/or an electronic service. This includes, but is not limited to, private individuals, employees of organizations and/or enterprises, members of community organizations, members of charity organizations, men, women, children, and teenagers. In its broadest sense the user may further include, but not be limited to, software systems, mechanical systems, robotic systems, android systems, etc. that may be characterised by accessing, for example, electronic content and/or an electronic service.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

"Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Referring to FIG. 1 there is depicted a network environment 100 within which embodiments of the invention may be employed supporting password systems and/or password applications/providers (PSPAPs) according to embodiments of the invention. Such PSPAPs, for example support the provisioning of data to a user, e.g. electronic mail, the provisioning of services, e.g. online banking, online retail, etc., as well as other personal and work related resources, systems, data, etc. As shown first and second user groups 100A and 100B respectively interface to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. Google™, within which other first and second user groups 100A are and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 100A may form associations either through standards such as IEEE 802.15 and Bluetooth as well in an ad-hoc manner.

Also connected to the network 100 are Social Networks (SOCNETS) 165, such as Facebook™, LinkedIn™, first and second services 170A and 170B respectively, e.g. US Medicare.GOV and Bank of America™, online gaming website 170C, e.g. World of Warcraft™, cloud based email service 170D, e.g. Yahoo!™, customer resource management 175A, e.g. Streak CRM for Google Cloud, and digital document signature function 175, e.g. Adobe™ Acrobat, as well as first and second servers 190A and 190B which together with others, not shown for clarity. First and second servers 190A and 190B may host according to embodiments of the inventions multiple services associated with a provider of password systems and password applications/providers (PSPAPs); a provider of a SOCNET or Social Media (SOME) exploiting PSPAP features; a provider of a SOCNET and/or SOME not exploiting PSPAP features; a provider of services to PEDS and/or FEDS; a provider of one or more aspects of wired and/or wireless communications; an Enterprise 160 exploiting PSPAP features; license databases; content databases; image databases; content libraries; customer databases; websites; and software applications for download to or access by FEDs and/or PEDs exploiting and/or hosting PSPAP features. First and second primary content servers 190A and 190B may also host for example other Internet services such as a search engine, financial services, third party applications and other Internet based services.

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides PSPAP features according to embodiments of the invention; execute an application already installed providing PSPAP features; execute a web based application providing PSPAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
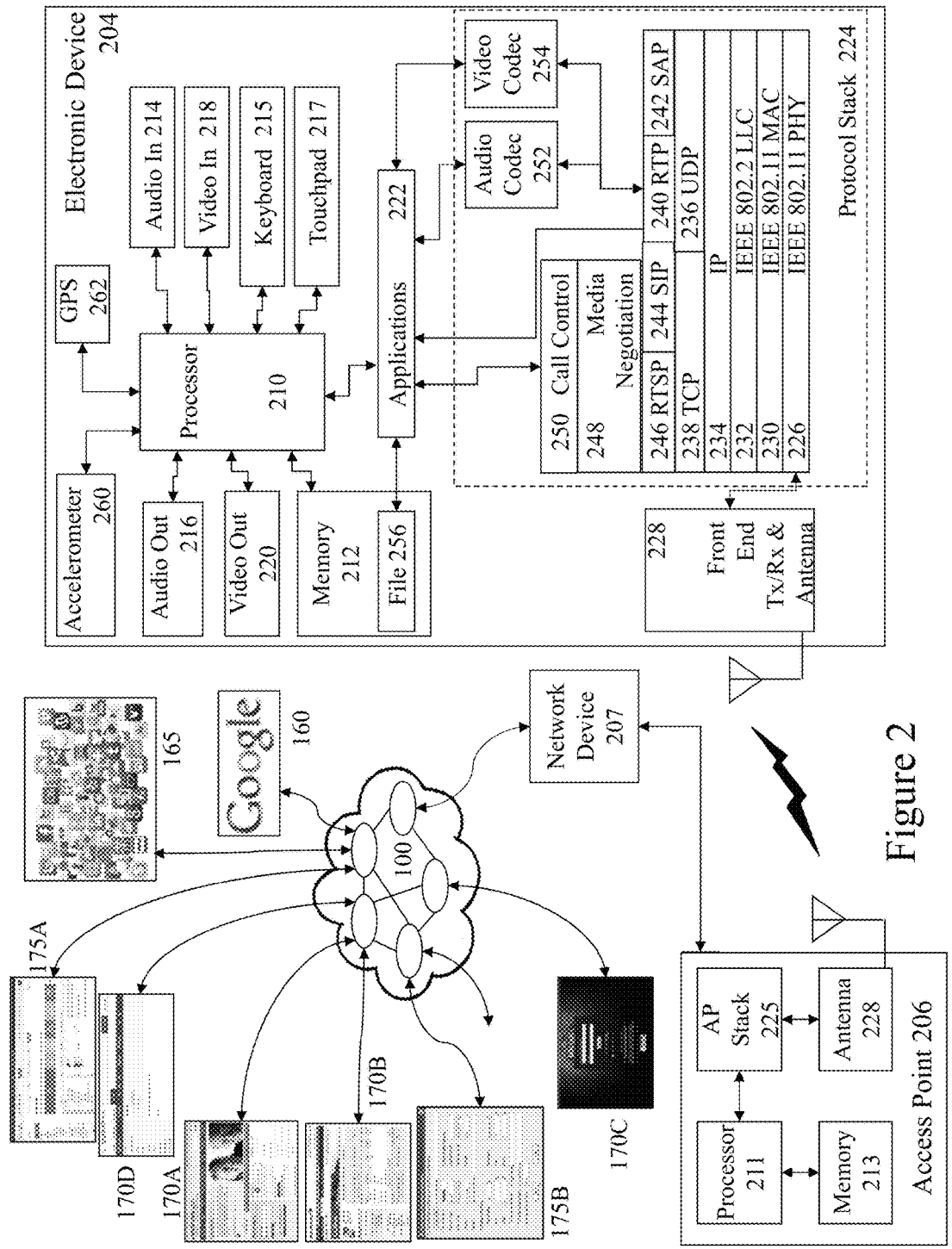
FIG. 2 depicts a wireless portable electronic device supporting communications to a network such as depicted in FIG. 1 and as supporting embodiments of the invention.

Now referring to FIG. 2 there is depicted an electronic device 204 and network access point 207 supporting PSPAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, such as Facebook™, LinkedIn™, first and second services 170A and 170B respectively, e.g. US Medicare.GOV and Bank of America™, online gaming website 170C, e.g. World of Warcraft™, cloud based email service 170D, e.g. Yahoo!™, customer resource management 175A, e.g. Streak CRM for Google Cloud, and digital document signature function 175, e.g. Adobe™ Acrobat, The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2- compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Figure 3:
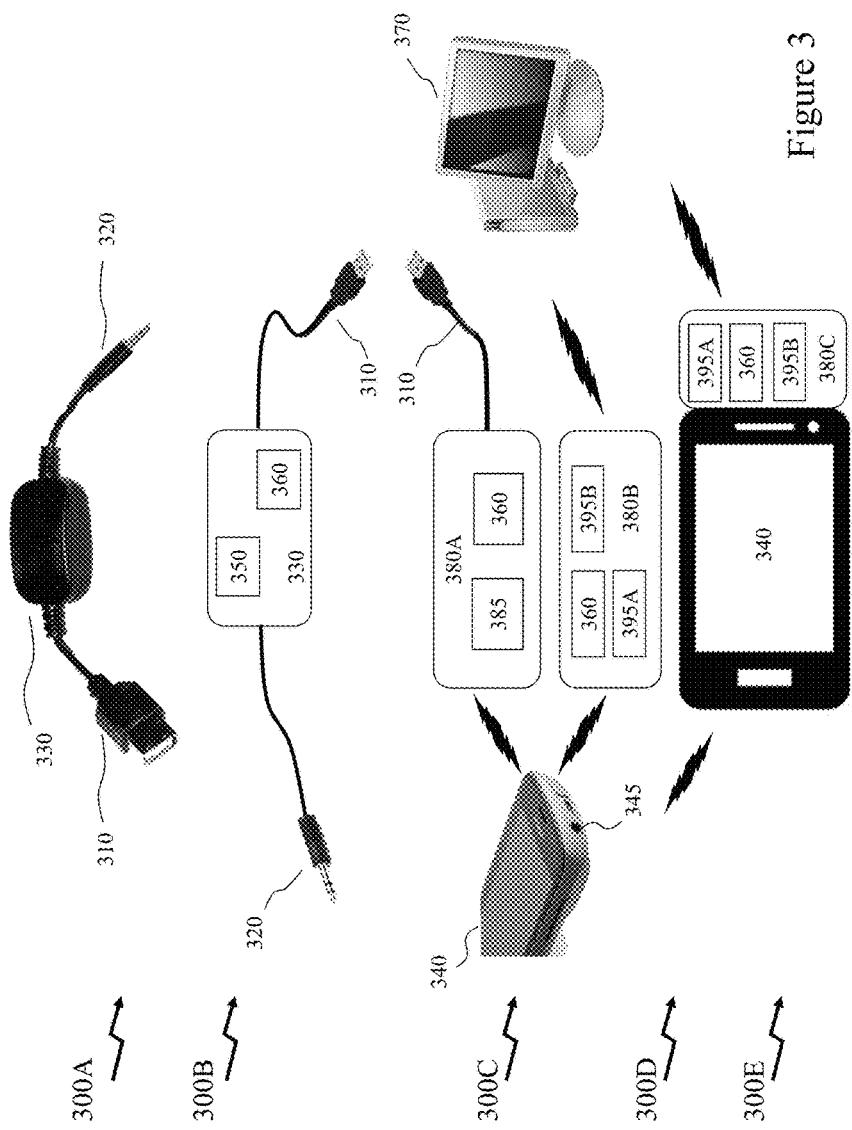
FIG. 3 depicts simplified diagrams for wired interface and wireless modules for interfacing between a portable electronic device (PED) and a host computer system according to embodiments of the invention.

Embodiments of the invention provide for a user of a primary electronic device (PRIME-ED), e.g. a PED associated with the user, the ability to employ the primary electronic device as an interface to a second electronic device (SEC-ED) user. In some embodiments of the invention a User Interface Adapter (UIA) may be required. Referring to FIG. 3 there are depicted first to fifth UIAs 300A to 300E respectively. In first UIA 300A a USB to audio conversion assembly comprising a Universal Serial Bus (USB) connector 310 at one end thereof, an audio jack 320, e.g. 3.5 mm audio jack as employed in most PEDs, laptops, etc., and a data adapter 330 therebetween, forms the UIA. As will become evident in respect of embodiments of the invention described below the UIA and its associated data adapters, e.g. acoustic data adapter (ADA) 330 provides functionality for enabling embodiments of the invention allowing the user's PRIME-ED, e.g. smartphone 340, to act as an interface to the SEC-ED, e.g. computer 370.

As depicted in second UIA 300B the ADA 330 interfaces via a headphone output port 345 of the smartphone 340 to receive user input and couples to a USB port of the computer 370 via USB connector 310. An audio jack 320 interfaces with the headphone output port 345 to receive audio signals provided at the headphone output port 345 of the mobile phone 340 wherein the ADA 330 couples these audio signals to an audio to digital converter (AUDIC) circuit 350 wherein they are converted into a digital signal. These digital signals are then converted to mimic control transducer input signals for controlling computer 370 by transducer mimic circuit (TRAMIC) 360. For example, the control transducer input signals may mimic user key entry on a keyboard. Alternatively, the control transducer input signals may mimic a keyboard and a mouse or only a mouse or another haptic interface to the computer 370 such as its touchscreen. As it is common to interface keyboards, mice, tablets, etc. to a SEC-ED, e.g. FED or PED, such as a laptop computer, desktop computer, smart television via a USB interface, then mimicking a keyboard, mouse, or another haptic peripheral is relatively straightforward once the digital signals for each key are known in these instances. Other interfaces such as touchscreens may require additional interfaces and/or software to provide the desired input.

Accordingly, each USB digital data sequence for a particular keyboard value, e.g. lower case a, upper case A, or the 4 and $ of the same key wherein the later includes a shift key operation, are stored within the TRAMIC 360 with an associated audio signal within the AUDIC 350. Accordingly, each audio signal from the PRIME-ED, e.g. smartphone 340, is then converted by the AUDIC 350 within ADA 330 to a digital signal which is then converted by TRAMIC 360 into the key press equivalent digital signal for provision to the USB port of the computer 370 via the USB connector 310. For example, if the user is entering a password, e.g. "HelloWorld!", then the smartphone 340 outputs a sequence of sounds that are mapped in sequence to digital signals mimicking a keyboard having the keys H, e, l, l, o, W, o, r, l, d, and ! pressed in sequence. This results in provision of the password "HelloWorld!" to the selected entry box of the first computer system 370. Thus selection of a textbox for receiving the password allows for provision thereof directly to the correct textbox without requiring a user to enter the password or even to know the password itself.

Optionally, the TRAMIC 360 may contain multiple emulators allowing the user to interface to the computer 370 as multiple external interfaces, e.g. keyboard and mouse, or emulate multiple variants of the same external interface, e.g. different keyboards, tablets, or mice, for example. Optionally, ADA 330 may also include additional memory incorporating an equivalent to the device driver for an external interface device or devices. Accordingly, the ADA 330 may in some embodiments of the invention emulate an interface with an already installed driver interface, typically a default driver of the SEC-ED, or in others it may extend the emulation to the SEC-ED loading a device driver from the ADA 330.

It would be apparent that wireless data communications may be useful for replacing portions of an ADA 330. Accordingly, as depicted with third UIA 300C a Wired-Wireless ADA (WWADA) 380A is depicted. Accordingly, WWADA 380A maintains in the USB connector 310 for coupling with the computer 370, the TRAMIC 360 to provide the emulated interface device electronic signals and a, and a Bluetooth™ circuit 385 for mimicking a Bluetooth™ speaker for receiving the sound signal from the smartphone 340 wirelessly. Alternatively, another sound communication standard such as Airplay™ may be supported. Optionally, other short range or near field communication standards may be employed rather than Bluetooth™ to provide wireless communications between the smartphone 340 and WWADA 380A. Accordingly, the Bluetooth™ communication standard replaces the wired connection to the smartphone 340 such that the computer 370 is provided with a simple dongle supporting Bluetooth™ sound signal to keyboard key press conversion and keyboard mimicking allowing for wireless convenience in some situations.

In fourth UIA 300D a Wireless ADA(WADA) 380B is depicted which includes first and second wireless interfaces (WIRINT) 395A and 395B respectively allowing the WADA 380B to pair wirelessly with both the smartphone 340 and computer 370 allowing the commands and/or data from the smartphone 340 to be communicated to the computer 370. Accordingly, user actions upon the smartphone 340 are wirelessly communicated through first WIRINT 395A to WADA 380B wherein they are converted by TRAMIC 360 before being wirelessly transmitted to the computer 370 by second WIRINT 395B and recognized as user commands and inputs. In this manner the WADA 380B may emulate a wireless keyboard, wireless mouse, wireless tablet, etc.

Similarly, in fifth UIA 300E a WADA 380C is depicted which includes first and second WIRINTs 395A and 395B respectively allowing the WADA 380C to pair wirelessly with both the smartphone 340 and computer 370 allowing the commands and/or data from the smartphone 340 to be communicated to the computer 370. Accordingly, user actions upon the smartphone 340 are wirelessly communicated through first WIRINT 395A to WADA 380C wherein they are converted by TRAMIC 360 before being wirelessly transmitted to the computer 370 by second WIRINT 395B and recognized as user commands and inputs. In this manner the WADA 380B may emulate a wireless keyboard, wireless mouse, wireless tablet, etc. In contrast to WADA 380B in fourth UIA 300D WADA 380C is configured as a module mounted to the smartphone 340 or having the smartphone 340 mounted to it. For example, WADA 380C may comprise a case for smartphone 340 within which the first and second WIRINTs 395A and 395B and TRAMIC 360 are integrated. Alternatively, WADA 380C may replace first WIRINT 395A with an audio jack, e.g. audio jack 320, such that the WADA connects to the smartphone 340 via the audio socket 345. Similarly, second WIRINT 395B may be replaced with USB connector 310.

Optionally, rather than connecting via the audio jack the PRIME-ED may communicate to an ADA or WADA via another interface such as for example, mini-USB adapter, micro-USB, Apple Lightning connector, USB 3.0 connector, and USB Type-C connector. Optionally, rather than using Bluetooth™ to couple to the PRIME-ED and/or SEC-ED to/from the ADA/WADA embodiments of the invention may exploit other wireless communications standards including, but not limited to, RFID, RuBee, Zigbee, Near Field Communications (NFC), DASH7, IEEE 802.11 Wi-Fi, IEEE 802.22 Super Wi-Fi, IEEE 802.15, and IEEE 802.20.

Now referring to FIG. 4A there is shown a simplified flow diagram 400A of a method of entering user text data into an application in execution upon a SEC-ED exploiting a PRIME-ED and an ADA/WADA such as described above in respect of FIG. 3 with first to fifth UIA 300A to 300E respectively. Accordingly the process comprises:
  step 405—associate UIA (e.g. ADA/WADA) to PRIME-ED;
  step 410—authenticate UIA to PRIME-ED;
  step 415—associate UIA to SEC-ED;
  step 420—authenticate UIA to SEC-ED;
  step 425—receive user input, e.g. touchscreen motion;
  step 430—transmit user entry to UIA from PRIME-ED;
  step 435—acting as a mouse UIA enters positional data to SEC-ED relating to user input;
  step 440—select application on SEC-ED associated with pointer location after positional data entered;
  step 445—receive user input, e.g. touchscreen keyboard entry;
  step 450—transmit user text entry to UIA from PRIME-ED; and
  step 455—acting as a keyboard UIA enters text into application upon SEC-ED according to user input.

Now referring to FIG. 4B there is shown a simplified flow diagram 400B of a method of entering user text data into an application in execution upon a SEC-ED exploiting a PRIME-ED and a ADA/WADA such as described above in respect of FIG. 3 with first to fifth UIA 300A to 300E respectively. Accordingly the process comprises:
  sub-flow 4000 comprising steps 405 to 435 in flow diagram 400A the UIA is paired and authenticated to the PRIME-ED and SEC-ED and positional data is entered into the SEC-ED relating to user input;
  step 460—receive user voice input;
  step 465—perform speech recognition on PRIME-ED;
  step 470—transmit user text input to UIA from PRIME-ED; and
  step 475—acting as a keyboard UIA enters text into application upon SEC-ED according to user input.

Within other embodiments of the invention the UIA may automatically provide password entry into a password entry screen such as described with respect to U.S. Provisional Patent Application 62/077,351 entitled "Secure Content and Encryption Methods and Techniques" filed Nov. 10, 2014 allowing the UIA to perform a user login and registration sequence prior to receiving the user data/input which is then translated and provided to the SEC-ED from the PRIME-ED.

Accordingly, it would be evident that the PRIME-ED, e.g. a smartphone, may connected to a SEC-ED, e.g. a personal computer (PC), via a third device, the UIA, such that the PRIME-ED is isolated from the SEC-ED by the UIA so that the SEC-ED cannot access the PRIME-ED to mount an attack, transfer a virus, etc. allowing the user's PRIME-ED to be secure. It would therefore be evident that this configuration allows the user's PRIME-ED to form a reliable common intelligent user interface to a range of electronic systems, machines, microprocessor based devices, etc.

Further, within the prior art it is known that speech recognition (SR) systems require extensive training and use in order to be effective. Some SR systems use "speaker-independent speech recognition" while others use "training" where an individual speaker provides predetermined sections of text, words, phrases, etc. into the SR system. Those SR systems with training analyze the person's specific voice and use it to fine-tune the recognition of that person's speech, resulting in more accurate transcription. SR systems that do not use training are often referred to as "speaker-independent" systems whilst those using training are called "speaker-dependent" systems.

In general SR systems that are speaker independent typically exploit limited vocabularies or standard predefined phrases. Such SR applications include, for example, voice user interfaces such as voice dialing, e.g. "call home", call routing, e.g. "I would like to make a collect call", domestic appliance control, e.g. "turn radio on", searches e.g. find a podcast with keywords in title, simple data entry, e.g., entering a credit card number, or the preparation of structured documents, e.g. a radiology report. However, the average user will perform a large number of free format text processes where speaker independent approaches become limited, e.g. speech-to-text processing such as word processors, texts, emails, etc., and more generalized machine interfaces. In these generalized applications their deployment has been limited and handicapped by the inability of each system to learn the user's vocal patterns. However, embodiments of the invention provide for a user to exploit a learning based SR system upon their PED and provide input to a variety of electronic and mechanical systems with microprocessor controllers and interfaces. As depicted in FIG. 4B the user's vocal input is converted to text through an SR system.

However, in other instances the system to which the user wishes to communicate does not accept keyboard, mouse or other haptic interface data and requires voice commands/voice data. Accordingly, referring to FIG. 4C there is depicted a simplified flow diagram 400C of a method of entering user vocal data into an application in execution upon a SEC-ED exploiting a PRIME-ED and a UIA such as described above in respect of FIG. 3 with first to fifth UIA 300A to 300E respectively. Accordingly the process comprises:

step 405—associate ADA/WADA (i.e. UIA) to PRIME-ED;
step 410—authenticate UIA to PRIME-ED;
step 460—receive user voice input;
step 465—perform speech recognition on PRIME-ED;
step 480—generate a default voice using the user's speech recognized text;
Decision=emulate microphone or generate audio
step 485—wherein the decision is to generate audio then a loudspeaker within the PRIME-ED is employed to generate an audible signal representing the user's language but within a default voice easily recognized by the SR systems within the system being addressed;
step 490—transfer the default voice with user text to the UIA from the PRIME-ED; and
step 495—acting as a microphone the UIA enters the user text to the SEC-ED as vocal input with the default voice.

Referring to FIG. 5A, shown is a word processor page 501 on a screen 500 which has encoded with bar codes 502. Accordingly, three corners of the web page comprise alignment symbol in the form of a 2D bar codes 502, e.g. Quick Response (QR) codes. However, also stored within each alignment symbol is data relating to the document such as name, revision, etc. which may be displayed on the PRIME-ED after being captured through an image capture of the display of the SEC-ED. The 2D bar codes 502 may also relate to standard input boxes and in some embodiments their required and/or auto-populated content for the document 520. As such, a visual capture of the word processor page 501 or a portion thereof allows the PSPAP to orient and locate the web processor page 501 relative to the screen 500 and the text boxes relative to the word processor page 501 before proceeding to generate the data for entry into the appropriate entry fields in an automated fashion. Accordingly, the touchscreen of the user's PRIME-ED may be set to the extent of word processor page 501 rather than the extent of the display screen such that user motions are limited to the currently selected application within some embodiments of the invention.

Of course, semi-automated data entry, where a user authenticates and then clicks on each entry field and then the data for said entry field is transmitted is also supported. In some embodiments, authenticating to the PRIME-ED PSPAP results in access to numerous data fields in succession without re-authenticating. In the example where the web page being displayed is known to the PSPAP, either because the user has indicated such or the PSPAP has determined it, the fields for that word processor document become accessible in response to a single authentication either in a predefined order or in an order selected by the user. Within FIG. 5A each of the three bar codes 502 is identical so that partial or complete obscuration of one or two bar codes 502 by another overlaying webpage does not impact the data entry process. Additionally, the user can enter text etc. into the document 520 using voice recognition and/or keyboard entry upon their PRIME-ED. As the UTA emulates a keyboard then the user can also generate and trigger command code strings accessing one or more dropdown menus 525 within the word processing page 501.

Alternatively, rather than three identical bar codes 502 an alternative embodiment of the invention may present such as depicted in FIG. 5B a word processor page 510 with document 520 upon a screen 500B is depicted but now word processor page 510 has first and second 1D bar codes 511 and 512 respectively. Alternatively, a single bar code 502 may be replaced with multiple bar codes each typically containing less data but adapting the bar code display to the SEC-ED upon which it is being displayed, for example, or a determined capability of the user's PRIME-ED upon which the PSPAP is in application. For example, Version 1 QR Codes (21×21), containing 10 alphanumeric elements at high (H) error correction levels may be employed in contrast to each bar code 502 in FIG. 5A which may, for example, be a Version 4 QR code (33×33) containing 50 characters at the same H error correction level. Optionally, the bar codes 502, linear bar code and multiple QR codes may be replaced with one or more code types including, but not limited to, 1D bar codes, UPC-A bar code, EAN-13 bar code, micro-QR codes, EZcode, high capacity color barcodes, MaxiCodes, and ShotCodes. An extended, but non-exhaustive, list of code types is provided by Wikipedia at http://en.wikipedia.org/wiki/Barcode.

Figure 5C:
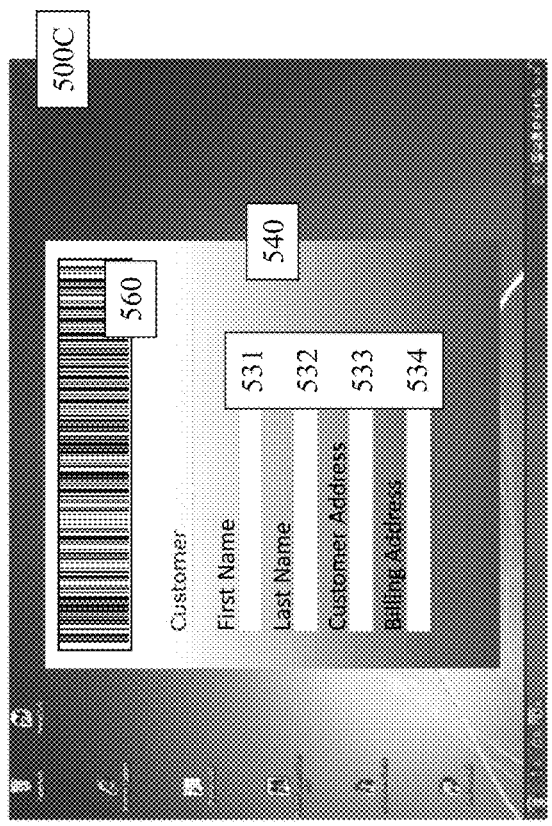
Figure 5D:
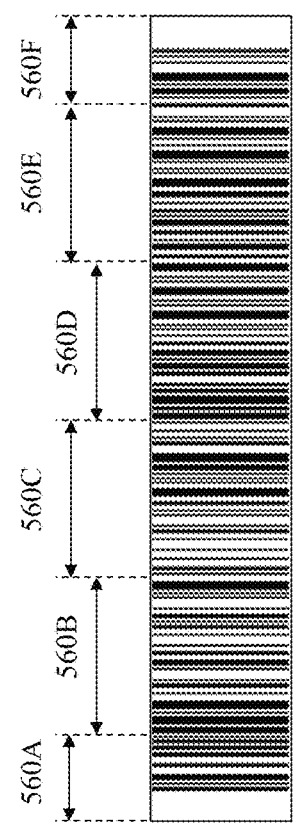
FIG. 5D depicts an exemplary 1D bar code according to an embodiment of the invention providing location information for a window such as described in respect of FIGS. 5A to 5C.

Now referring to FIG. 5C there is depicted a login screen 540 upon a screen 500C according to an embodiment of the invention wherein the login screen 540 comprises first to fourth fields 531 to 534 respectively and bar code 560. As depicted in FIG. 5D the bar code 560 is depicted as comprising first to sixth code segments 560A to 560F respectively which, for example, are:

First segment 560A comprising quiet zone and start character(s);
Second segment 560B comprising coordinate information for first field 531;
Third segment 560C comprising coordinate information for second field 532;
Fourth segment 560D comprising coordinate information for third field 533;
Fifth segment 560E comprising coordinate information for fourth field 534; and
Sixth segment 560F comprising checksum characters and quiet zone.

Figure 4C:
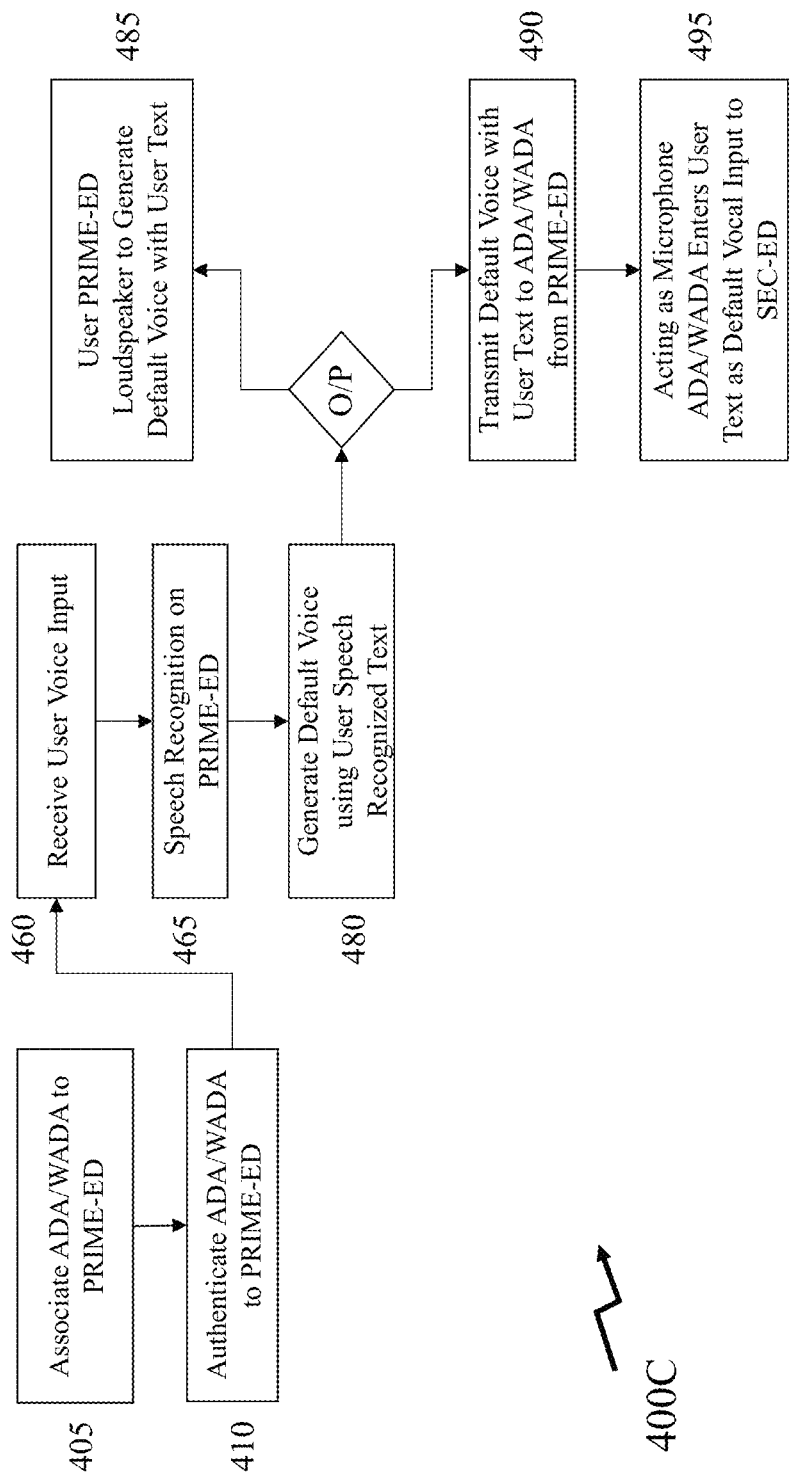

Accordingly, the PSPAP upon the user's PRIME-ED acquires the bar code 560 associated with the login screen 540 and responds to the SEC-ED upon which it is displayed though embodiments of the invention, such as described supra in respect of FIGS. 3 to 4C by providing:

First cursor control and field selection emulation using coordinate data within second segment 560B;
First keyboard emulation to enter data into first field 531;
Second cursor control and field selection emulation using coordinate data within third segment 560C;
Second keyboard emulation to enter data into second field 532;

Third cursor control and field selection emulation using coordinate data within fourth segment 560D;

Third keyboard emulation to enter data into third field 533;

Fourth cursor control and field selection emulation using coordinate data within fifth segment 560E; and Fourth keyboard emulation to enter data into fourth field 534.

Optionally, each data segment providing coordinate data for the field may also provide the PSPAP with an identifier of the field and login screen 540 such that the PSPAP may retrieve the appropriate information. Accordingly, bar codes may be presented as part of applications to the user for capturing upon their PRIME-ED in order to orientate their actions upon the PRIME-ED or select the application of a plurality of applications open upon the SEC-ED that their text entry (e.g. touchscreen keyboard or voice generated) and mouse actions relate. Within other embodiments of the invention the SEC-ED may comprise an operating system allowing activation of applications and other high level operating system functions. For example, a user may with their PRIME-ED view a list of documents, select one, and choose to print wherein the actual sequence of file opening, selecting print, and printing are executed by SEC-ED using commands provided from the PSPAP upon the PRIME-ED/

Figure 6A:
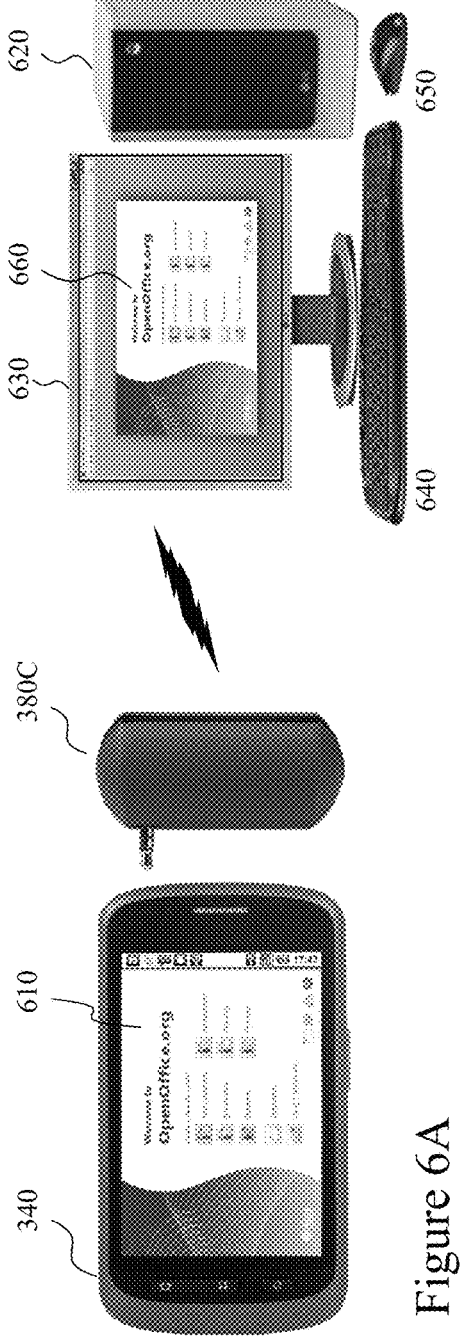
FIG. 6A depicts a simplified diagram for a wireless modules for interfacing between a user's PED and a host electronic system according to an embodiment of the invention synchronizing the host electronic system activities to the PED and exploiting the host systems haptic interfaces.

Now referring to FIG. 6A there is depicted a simplified diagram for wireless module 380C, such as described in FIG. 3, interfacing between a user's PED namely smartphone 340, e.g. PRIME-ED, and a host electronic system, e.g. SEC-ED 620, according to an embodiment of the invention allowing synchronization of the host electronic system activities to the PED and exploiting the host systems haptic interfaces such as keyboard 640 and mouse 650 whilst displaying the current activities to the user on a display 630. Accordingly, the application 610 on the user's PED display is also displayed on the display 330 as synchronized application 660.

Figure 6B:
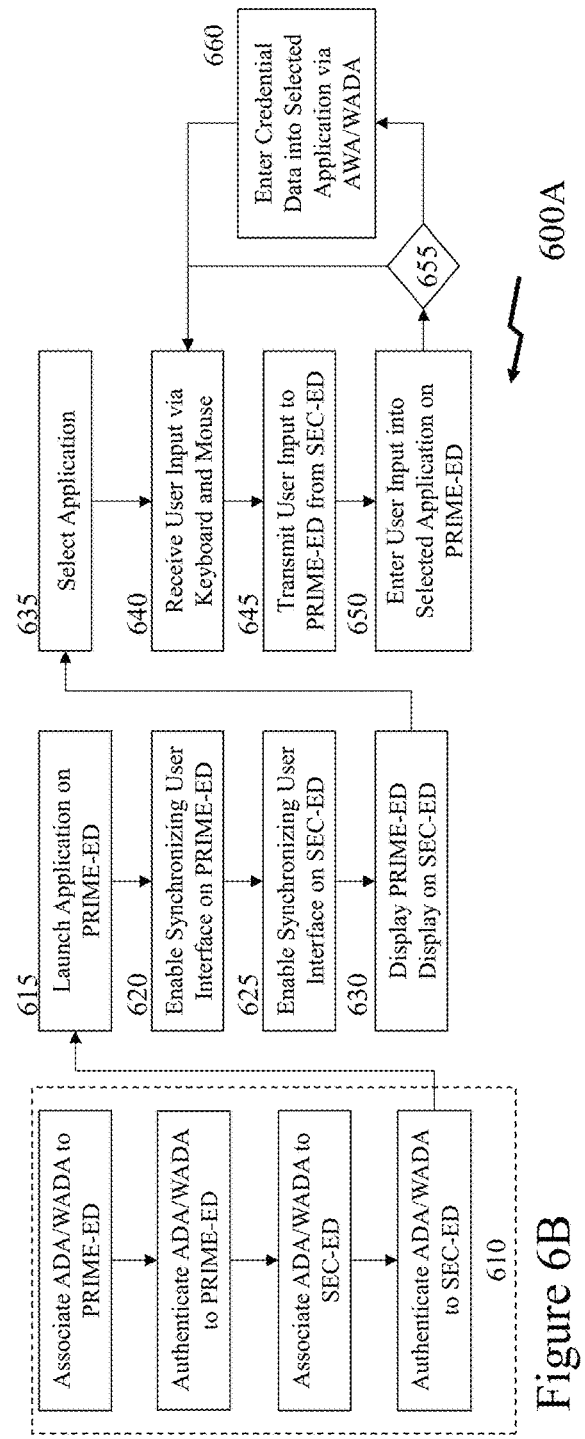
FIG. 6B depicts a simplified flow diagram according to embodiment of the invention relating to synchronizing a user' PED and host electronic system.

Referring to FIG. 6B there is depicted a simplified flow diagram 600A according to embodiment of the invention relating to synchronizing a user' PED and host electronic system. As depicted the process begins with sub-flow 610 comprising steps 405 to 420 of process flow 400A depicted and described with respect to FIG. 4A wherein the UTA 380C associates with the PRIME-ED, smartphone 340, and SEC-ED 620. Accordingly, after this association sequence the process comprises:

step 615—launch application upon PRIME-ED;

step 620—enable synchronizing user interface (UI) on PRIME-ED;

step 625—enable synchronizing user interface (UI) on SEC-ED;

step 630—display the current display rendered to the user on their PRIME-ED display on the SEC-ED display 630;

step 635—user selects an application through the rendered display 660 on the SEC-ED 630;

step 640—the UI on the SEC-ED receives user input via keyboard 640 and mouse 650 and performs actions/data entry within SEC-ED rendered application;

step 645—the UI on the SEC-ED communicates the user input to the PRIME-ED via the UIA;

step 650—the received user input is entered in the application upon the PRIME-ED and the associated actions/data entry within the PRIME-ED rendered application;

step 655—a determination is made as to whether the associated actions/data entry requires user credential entry into the application wherein this may be automatically provided from the PRIME-ED to the SEC-ED via the UIA using a process according to an embodiment of the invention described above leading the process to step 660 or looping back to step 640;

step 660—wherein the user credentials are entered if required via the UIA and then the process loops to step 640.

Wherein the application being executed and synchronized back to the PRIME-ED from the SEC-ED does not require credential entry then the process may be simplified. Within another embodiment of the invention the user entry through the SEC-ED haptic interfaces is transmitted to the UIA and therefrom to the PRIME-ED wherein it is rendered and stored but the synchronization UI does not render to the SEC-ED display. Alternately, the video feed or an encapsulated form of the rendered application on the PRIME-ED is transmitted to the SEC-ED and displayed. For example, within one embodiment of the invention the driving signals to the PRIME-ED display driver are communicated via the UIA to the SEC-ED. Alternately, screen captures, portable document formats, etc. may be employed. In each instance the association of the keyboard and mouse, or other haptic interface inputs, are disassociated from the application actually in execution or alternatively not captured. Within another embodiment of the invention the synchronization UI on the SEC-ED may receive the keyboard, mouse, or other haptic interface entries direct and encrypt these such that the synchronization UI on the PRIME-ED may decrypt but what is stored even temporarily upon the SEC-ED is encrypted.

Figure 7:
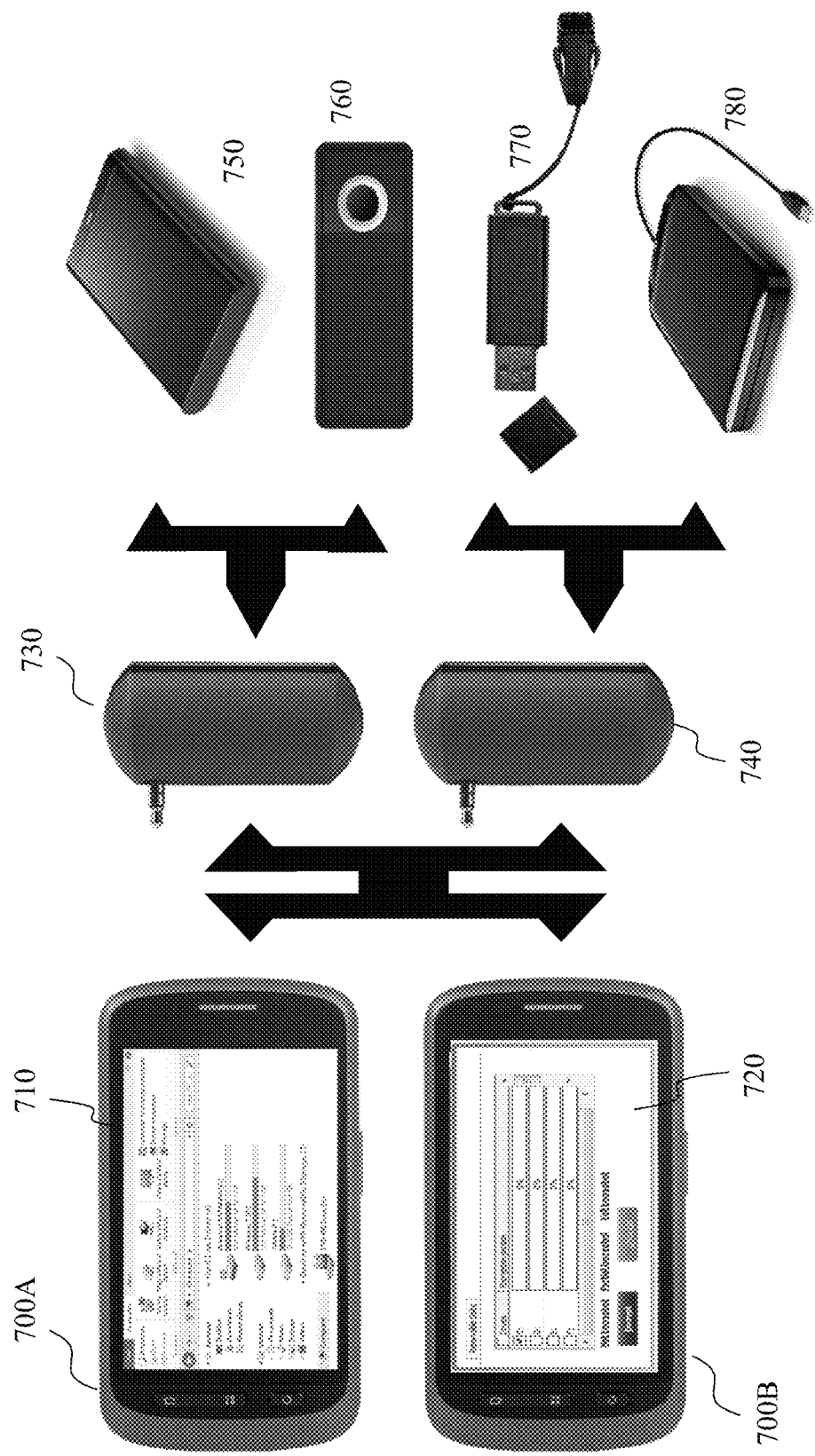
FIG. 7 depicts a simplified diagram for wired and wireless modules for interfacing between a user's PED and external memory devices according to embodiments of the invention.

Now referring to FIG. 7 there is depicted a simplified diagram for wired and wireless modules for interfacing between a user's PED and external memory devices according to embodiments of the invention. As depicted a first PRIME-ED 700A is executing a file management application, e.g. Microsoft Explorer, and may be coupled to either WADA 730 or ADA 740 respectively via the audio jack socket. WADA 730 employing wireless communications may be wirelessly coupled to first and second external memory devices (EMDs) 750 and 760 whereas ADA 740 employed a wired USB socket interface may be coupled to third and fourth EMDs 770 and 780 respectively. Alternatively, a second PRIME-ED 700B executing an encryption routine 720 may similarly communicate with any of first to fourth EMDs via WADA 730 or ADA 740 as appropriate. Optionally, a WADA 730 or ADA 740 may be integrated within an EMD such as first to fourth EMDs 750 to 780 respectively.

Accordingly a PRIME-ED which will typically have 16 GB-32 GB of memory may access an EMD if 500 GB/1 TB or above at a much lower cost. Typically increasing PRIME-ED memory today costs ~$2/GB whereas EMD memory typically costs ~$0.05-$0.10/GB. It would be evident therefore that a PRIME-ED may access secure external memory and act as a secure authentication device for such secure encrypted memory. It would be further evident that where a PRIME-ED may support multiple users through multiple user accounts that each user account may be associated with a different encryption upon the same EMD allowing a single EMD to support multiple users in a secure manner.

Optionally, such secure access to an EMD through a contextually and location aware PRIME-ED also allows the EMD to be locked unless within a predetermined geographically defined area or location (i.e. the EMD is geofenced) releases the encryption process to decrypt or encrypt data from/to the EMD.

Figure 8:
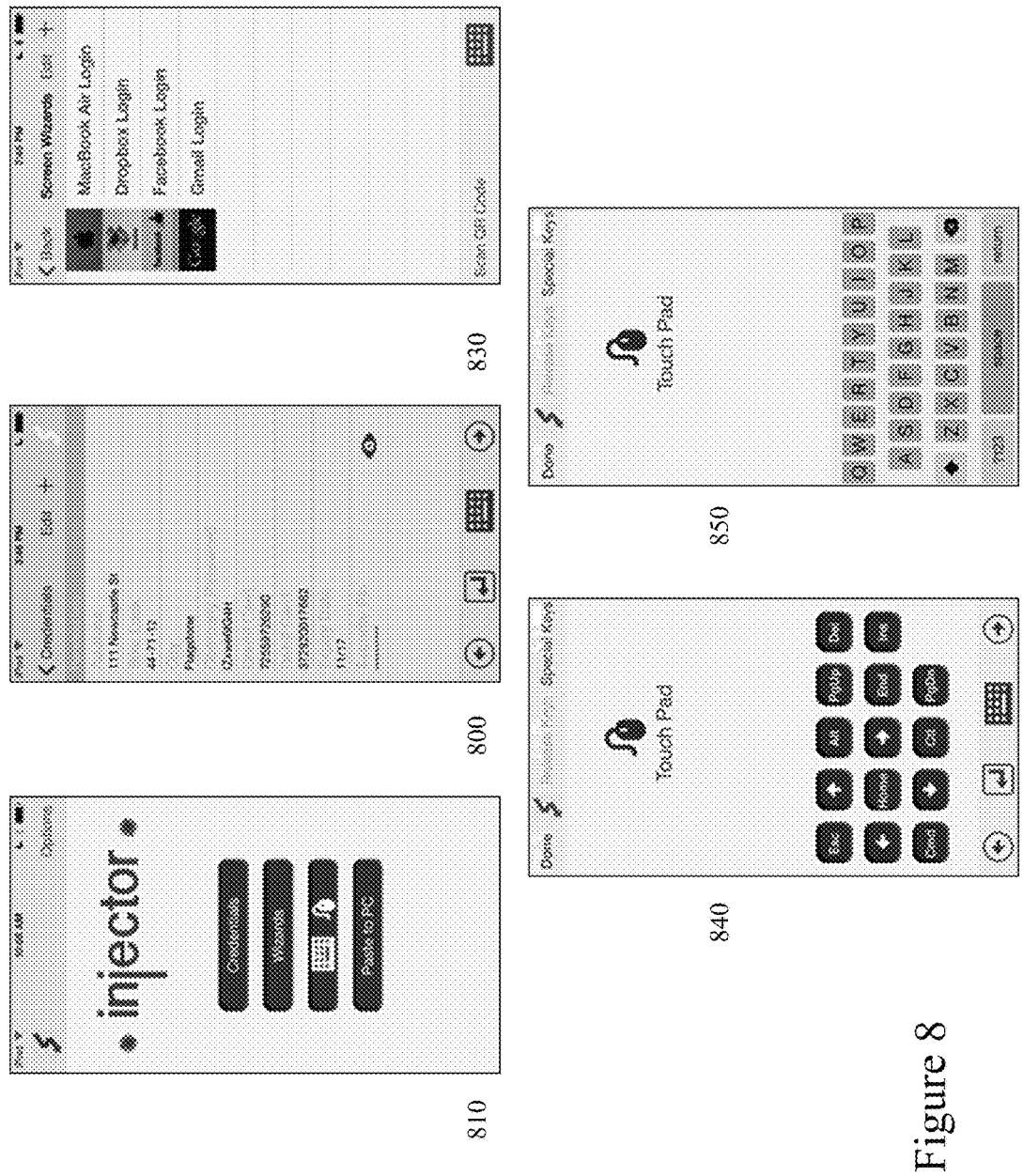
FIG. 8 depicts exemplary screen images from a PSPAP according to an embodiment of the invention.

Now referring to FIG. 8 there are depicted first to fifth exemplary screen images 810 to 850 for a PSPAP according to an embodiment of the invention. First screen image 810 presents a menu screen to a user allowing them to select different functional options, such as:

"Credentials" which links the user to second screen image 820 with a list of elements and their values that have been stored within the PSPAP;

"Wizards" which links the user to third screen image 830 that provides automated functions for the user, such as depicted with automated logins for MacBook Air, Dropbox, Facebook, and Gmail;

"Keyboard—Mouse" which links the user to third screen image 840 and therefrom by selection of the keyboard icon on the bottom of third screen image 840 with fourth screen image 850, wherein third screen image 840 provides the user with the ability using a touchscreen on their PED to move their finger and mimic to the computer system movement of a mouse together with specific mouse/keyboard functions whilst fifth screen image 850 presents the user with keyboard on their PED such that as they type the PSPAP mimics a keyboard to the computer system.

Wizards are beneficial to users for web site form filling and logins. Typically a PSPAP will be able to access downloadable wizard templates for the user to choose from. Each wizard template contains place holders for credential items that the user selects from their credential sets and the wizard will automatically use those items whenever it is executed. Optionally the user may also manually execute a wizard to perform a web login or form fill by placing the cursor over the first input field and then tapping on the desired PSPAP wizard. The PSPAP wizard then proceeds to complete the web login or form fill moving from field to field and filling them in with the referenced credential items. Alternatively, a user may access one or more PSPAP browser extensions/plug-ins such as described below and depicted in FIG. 23 allowing the user to select a recognized input field, trigger a popup of a QR code, and then subsequently scan the QR code with their PED and the PSPAP will automatically find the correct PSPAP wizard for that page and execute it.

Figure 9:
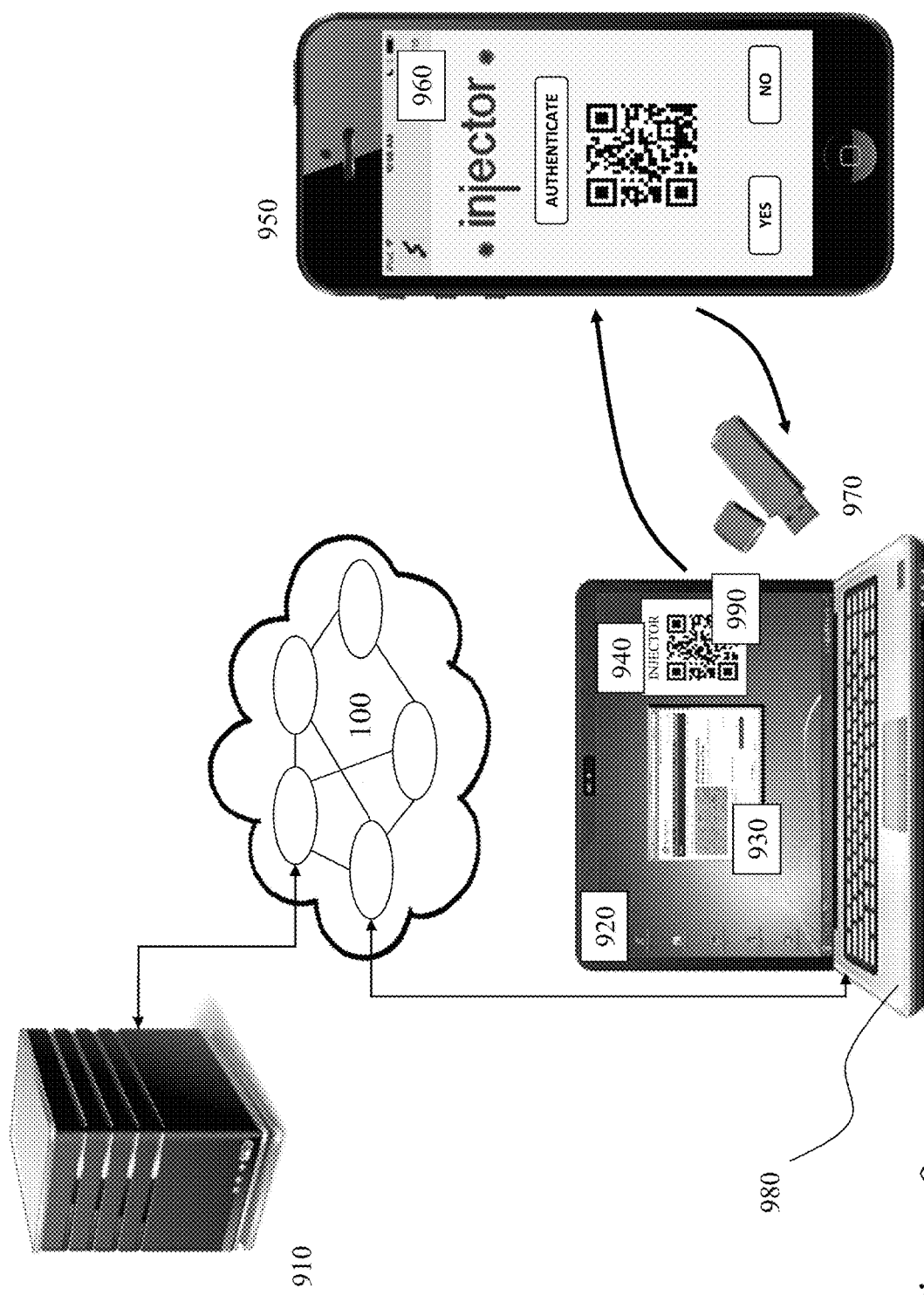
FIG. 9 depicts a simplified diagram showing an authentication method according to an embodiment of the invention for responding to a challenge issued by a remote authentication server.

Now referring to FIG. 9 there is depicted a simplified diagram showing an authentication method according to an embodiment of the invention for responding to a challenge issued by a remote authentication server. Accordingly, a user as part of an activity upon their PED 950, e.g. a financial transaction, online purchase, etc., within a web browser or user interface is provided with a challenge from a server 910 which they wish to complete upon a secondary computer system 980, e.g. an FED such as their laptop, PC, smart TV, ATM etc. Accordingly, the user exploits an ADA or WADA such as described above in respect of FIGS. 3 and 6A, depicted as USB device 970, therein triggering a synchronization such as described in respect of FIG. 6B, for example. Accordingly, this triggers displayed application 930 via the PED 950 and USB device 970 and PSPAP plug-in 940 from the remove server 910 upon the secondary computer system 980. The user may exploit their PED 950 to capture authentication requests/challenges within the presented QR code 990. If the decision of the user is to authenticate then the synchronization UI within the PSPAP transmits to the USB device 970 attached to the secondary computer system 980 such that the authentication requests/challenges are presented upon the secondary computer system 980. The user can then exploit the haptic interfaces of the secondary computer system 980 to enter their responses to the authentication requests/challenges. In some instances the challenge may request additional information in addition to the basic authentication code(s) wherein this requirement would also be captured and embedded within the QR Code 990, retrieved by the PSPAP or entered by the user. In either case the user entered responses to the authentication requests/challenges upon the secondary computer system 980 are transmitted back to the PED 950 via the USB device 970 and therein to the remote server 910 via the network 100.

Optionally, the synchronization UI may extract configuration and/or system information of the secondary computer system 980 to provide to the PED 950 via the USB device 970. Accordingly, in some embodiments of the invention the challenge can only be correctly met if the PED 950 provides correct data relating to the secondary computer system 980 in addition to the correct challenge responses themselves. Optionally one or more identity aspects of the secondary computer system 980 may be employed to encrypt the data provided from the PED 950 in response to the challenges sent to the remote server 910.

Optionally, the PSPAP plug-may, to prevent spoofing, add additional content to the QR code 990 wherein the additional content is known only by the PSPAP plug-in and the PSPAP upon the user's device. Accordingly, the PSPAP upon the user's device can verify that the QR code 990 comprises visual code data generated in dependence upon the request from a trusted entity and is not being replayed or spoofed. The additional content may include, but not limited to, a digital signature, a one-time password, and a digital representation of a signature.

Accordingly, it would be evident that an embodiment of the invention such as described and depicted in respect of FIG. 9 exploiting QR codes may be employed as part of registration and/or authentication challenges such as those arising within evolving/emerging standards and proposed standards for reducing the reliance on passwords to authenticate users including for example, but not limited to, the FIDO Alliance's Universal Authentication Framework (UAF) protocol and Universal Second Factor (U2F) protocol.

Within the embodiments of the invention discussed and presented above there is an implicit rather than explicit assumption that an application is already installed and/or in execution upon an SEC-ED. However, in other embodiments of the invention a PRIME-ED may include the ability for the PRIME-ED to initially transfer an application to the SEC-ED via the UIA prior to the SEC-ED executing it. In this manner, the SEC-ED does not need to have the software previously installed but it can be installed from the PRIME-ED or in other embodiments from the UIA directly or through transfer from the PRIME-ED to UIA and therein SEC-ED.

Within embodiments of the invention presented supra discussion has been primarily focused to the acquisition of login and form fill information which can be subsequently provisioned to a computer system to automate login and form fill operations. Additionally, reference is made to replacing passwords with PSPAP generated passwords to enhance security to obsolete those previously used by the user. However, it would also be evident that the PSPAP may support Time-based One-Time-Password schemes (TOTP) wherein a different password is generated for every login. Because the password changes on every login it cannot be comprised through theft of password hacking but the new passwords must be identifiable by the receiving service, website, application, enterprise, etc. as being valid despite having not been provided to the service, website, application, enterprise, etc. Accordingly, TOTP schemes exploit a One-Time Password (OTP) or have the user's PED automatically generate these codes which are time-synchronized and have a shared secret "seed" with the service, website, application, enterprise, etc. to which access is sought, authentication provided etc., Accordingly, multiple services, websites, applications, enterprises, etc. will each have their own secret "seed" and time-synchronization process. Accordingly, the PSPAP can support these through the user following the registration process for TOTP and using a special credential item type for the TOTP seed. Once the "seed" is stored within the PSPAP it will then generate the One-Time-Password codes whenever required.

It would also be apparent that in other embodiments of the invention other plug-ins to the PSPAP may be implemented by third parties to provide additional security/verification information. Once such instance being wherein a financial institution provides users with a security device to generate a security code for entry based upon their security code and other information such as partial account number to whom a transfer is being made. Accordingly, the financial institution may provide a plugin for the PSPAP allowing such security information to be generated within the PSPAP and transferred according to embodiments of the invention.

There are a number of situations where passwords may be required before a machine has even booted or user key stroke sequences required. Some examples are secure BIOS boot passwords and passwords to unlock many commercial full-disk-encryption products. These environments need to have a password before the operating system can even load, known commonly as pre-OS. Automating password fills when an operating system is not running does not present an issue to embodiments of the invention as there is no computer system side software requirement. Rather all the user has to do is plug in the USB device pre-OS and select the appropriate password within the PSPAP.

It would also be evident that the PSPAP may automate, in what the inventors refer to as a local mode, the login and form fill processes within a web browser, service, application, web page etc. upon the same PED and/or FED upon which the PSPAP is in execution as now the PSPAP can provide directly without external communication the required passwords, field selection etc.

Within embodiments of the invention presented supra the primary configuration has been a user's PED in conjunction with a computer system. However, it would be evident that the computer system may be generalized to a FED or another PED, e.g. an ATM, laptop, etc. and that the interfaces may be wired and/or wireless between the device executing the PSPAP and the device having the login screen requiring user input.

Within embodiments of the invention the USB device mimics a keyboard and/or a mouse. It would be evident that the USB device may mimic other cursor controllers other than a mouse including but not limited to a tracker ball, touchpad, touch sensitive screen, and an electronic tablet. Further, within the embodiments of the invention the USB interface has been depicted as employing USB connectors according to Standard A. However, it would be evident that other embodiments of the invention may exploit USB connectors according to Standard B, Micro-B, and Mini-B. Alternatively, the USB device may exploit non-USB connectors including but not limited to RS-232, PS/2, serial port connectors, and parallel port connectors. Optionally, the USB device may connect directly to the computer system via a wireless interface and/or the USB device may be bypassed by the PED and/or FED executing the PSPAP communicating directly to the computer system. For example, a user's smartphone may exploit Bluetooth™ to mimic wirelessly connected keyboard and/or mouse.

Within the embodiments of the invention presented supra the primary configuration has been a user's PED having installed and in execution the PSPAP. However, it would be evident that in other embodiments of the invention the PSPAP may in execution upon a FED and be employed to provide password, credential, and identity information to applications, services, web pages and web browsers upon another FED or a PED. Accordingly, a gaming console may be employed to provide PSPAP functionality to an Internet enabled television. It would also be evident that a PED may also include a wearable device.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of entering data to a portable electronic device (PED) comprising:
    providing a user interface adapter (UIA) coupled to the PED and an electronic system with a haptic interface, wherein
    the UIA provides a first synchronization software application for installation upon the electronic system allowing for user entered data via the haptic interface of the electronic system to be communicated to the PED via the UIA; and
    the first synchronization software applications at least one of scrambles and encrypts the haptic interface data such that the haptic interface data is not employed in generating any aspect of the application to which it relates upon a display of the electronic system but is employed by the software application upon the PED to which it relates to generate an image for display upon the electronic system display.

2. The method according to claim 1, wherein
    the PED executes a second synchronization software application providing application data for display to the user upon a display of the electronic system with a software application other than a software application to which the display data relates.

* * * * *